United States Patent Office 3,575,687
Patented Apr. 20, 1971

3,575,687
PROCESS FOR THE SELECTIVE SEPARATION OF RARE EARTH METALS FROM THEIR AQUEOUS SOLUTIONS
James L. Drobnick, Lakewood, Paul R. Kruesi, Golden, and Tom P. Chen, Arvada, Colo., assignors to Molybdenum Corporation of America, Louviers, Colo.
No Drawing. Filed Sept. 12, 1969, Ser. No. 857,577
Int. Cl. C22b 59/00; C01f 17/00
U.S. Cl. 23—22
14 Claims

ABSTRACT OF THE DISCLOSURE

The recovery of rare earth metal values in aqueous solution by contacting the solution with an organic phase including an organic extractant comprised of a mixture of anionic and cationic extraction agents. The anionic agent is a quaternary ammonium or phosphonium compound and the cationic agent is selected from aliphatic and aryl phosphates, carboxylic acids, organophosphoric acids and oximes.

SUMMARY OF THE INVENTION

This invention relates to a process for the selective separation of rare earth metal values in aqueous solutions, more particularly, it relates to such separation effected by contacting the rare earth metal values to be separated with an organic extractant contained in a water immiscible organic phase under conditions which give the organic reactant a selective affinity for the rare earth metal values to be selectively separated.

The invention is illustrated by its specific application to the separation of yttrium values from other rare earth metal values; however, it can be used for the selective separation of other rare earth metal values from their aqueous solutions. The invention also has application for the recovery of rare earth metal values from other metal values.

In this specification and the claims, yttrium will be referred to as a rare earth metal in conformance with some authorities. By the term "rare earth metals" is meant the following metals as represented by their chemical symbols: Sc, Y, La, Ce, Pr, Nd, Pm, Sm, Eu, Gd, Tb, Dy, Ho, Er, Tm, Yb, Lu.

The rare earth metals generally occur in minerals associated with one another as phosphates and silicatess, for example, gadolinite, cerite, monazite, xenotime, bastnasite, and others. These minerals are always accompanied by a number of the other rare earth minerals so that leach solutions of the various rare earth minerals or ores contain values of practically all of the rare earth metals. Several by-product sources of yttrium and rare earth metal oxides result from processing ores of uranium values, particularly in Canada. After the leaching process, the metal is ordinarily present in the leaching solution in the nitrate form. Following purification and concentration of the leach solution to remove metal values other than rare earth metal values, the leach solution can be used as a feed solution in solid or liquid ion exchange processes, or in other methods for recovery of the metals.

Basicity precipitations used in the past for the recovery and/or separation of rare earth metal values have resulted in low yields of particular rare earth metal values. Single ion exchange reagents have been used for extracting rare earth metal values, including those of yttrium, from aqueous solutions. However, multiple stages and systems are required for purification of the values of yttrium and other rare earth metals. Although these processes are efficient, the retention times required for separation are long, more reagents are consumed, and, therefore, they are disadvantageous from an economic standpoint.

Accordingly, it is an object of this invention to provide a process for the selective separation of rare earth metal values from their aqueous solutions which has economic advantages over prior art processes.

It is another object of this invention to provide a method for the separation of yttrium values and other rare earth metal values in aqueous solutions with a minimum of separation stages.

The invention comprises contacting an aqueous solution of rare earth metal values with a water immisible organic phase containing an organic extractant comprising a mixture of anionic and cationic extraction agents. The solution is contacted with the organic extractant under conditions tailored to give the extractant a selective affinity for the metal values to be recovered or separated from others and which are dependent upon the selective distribution coefficients of the metal values and, therefore, their relative extractability. The affinity of the organic extractant may be for the metal value to be recovered or for the remaining metal values leaving the desired metal in the aqueous phase.

The anionic component of the extractant is a quaternary ammonium or phosphonium compound having aliphatic hydrocarbon radical substituents each having from 8 to 18 carbon atoms, or aryl group substituents. The cationic component of the organic extractant can be an extraction agent in which the reactive agent is either a carboxylic aid, an oxime, an organophosphoric acid compound, or an organic phosphate ester. Both the anionic and cationic component must be substantially water-immiscible and should have sufficient carbon atoms in the molecule to render the compound substantially insoluble in water. The components of the extractant and the metal complexes formed with them should be substantially solvent in the diluent used for the organic phase. An inorganic nitrate is used as a salting agent to promote extraction of the rare earth metal values.

As shown by the examples below, the invention is effective for use in a continuous counter-current system. In the illustrative application of the invention given herein, yttrium values are isolated by contacting the aqueous solution of rare earth metal values with the organic extractant under conditions which give the organic extractant an affinity for the other rare earth metal values so that they are removed by the extractant leaving yttrium values in the aqueous phase.

The aqueous phase containing metal values can be separated from the organic phase containing the remaining metal values by conventional means. The metal values in the aqueous phase can be recovered by precipitation or other means. The metal values in the organic phase can be recovered by stripping with acid. The depleted aqueous phase and the stripped organic phase can be returned to the circuit for reuse.

The quaternary ammonium anionic component of the organic reactant is of the type:

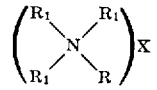

where R is an aliphatic hydrocarbon group having from 1 to 18 carbon atoms, or an aryl group, $R_1$ is an aliphatic hydrocarbon group having from 8 to 18 carbon atoms, or an aryl group, and X is an anion, in this case a nitrate ion. The quaternary ammonium compound used in the examples is the nitrate form of the compound sold commercially by the General Mills Company under the name "Aliquat 336" which is tricapryl monomethyl ammonium chloride. In this compound the R of the structural formula is $CH_3$, the X is an anion and the $R_1$ is a mixture of $C_8$–$C_{10}$ carbon atoms, with $C_8$ predominating. It functions as an anion exchanger in both acidic and alkaline solutions. Conversion from the chloride form to nitrate or other forms is accomplished by successive contact of the reagent with 1.5–2 molar solutions of the anion desired.

Since rare earth ions form rather weak anion complexes with nitrate ion, it is necessary to use a salting agent such as an inorganic nitrate to promote extraction of the rare earth metal values. The preferred nitrate is magnesium nitrate; however, nitrates of alkali and alkaline earth metals as well as those of ammonium and aluminum can be used. The salting agent serves both as a source of excess nitrate ion for complexing of rare earth metal ions and also to reduce the degree of hydration of the rare earth ions, hydration of metal ions usually being deleterious to processes for extracting them.

Quaternary phosphonium compounds in which the nitrogen of the above structural formula is replaced by phosphorous are equivalent anionic components of the organic reactant. Typical of these compounds is trioctyl benzyl phosphonium nitrate.

The preferred cationic component of the organic extractant mixture is an extraction agent in which the active reagent is an amidoxime represented by the structural formula:

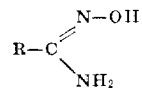

wherein R is an aliphatic hydrocarbon radical having from 6 to 20 carbon atoms, or any aryl radical. A preferred amidoxime is one in which R represents an aliphatic carbon chain having 11 or 12 carbon atoms, or a pentane ring structure. It is the active agent of a chelating extraction reagent sold commercialy under the name "Nopchelate OS" by NOPCO Chemical Company of Newark, N.J. The reagent contains about 80 percent active agent and 20 percent xylene diluent, with a specific gravity of 1.00. Its average molecular weight is about 270. It is insoluble in water but completely miscible in aromatic and aliphatic diluents. The apparent extraction mechanism involves metal ion exchange for the hydroxyl hydrogen, since free base must be added to aqueous rare earth nitrate-amidoxime systems to achieve transfer of metal ions from the aqueous to the organic phase. The reaction is very similar to that occurring with carboxylic acid extractants.

Other oximes which are equivalents are other amidoximes conforming to the above structural formula in which R is an aliphatic hydrocarbon radical having from 6–20 carbon atoms or a cyclic hydrocarbon radical. Other equivalent members are aldoximes conforming to the formula:

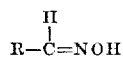

wherein R is an aliphatic hydrocarbon radical having from 6–20 carbon atoms or a cyclic hydrocarbon radical, ketoximes conforming to the formula:

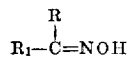

wherein R and $R_1$ are aliphatic hydrocarbon radicals having from 6–20 carbon atoms or a cyclic hydrocarbon radical, and alpha hydroxy oximes conforming to the formula:

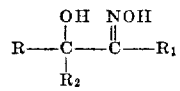

wherein R, $R_1$ and $R_2$ are aliphatic hydrocarbon radicals having from 6–20 carbon atoms.

Other equivalent cationic components for the organic extractant mixture are organophosphoric acids represented by the structural formula:

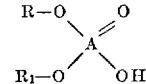

wherein R is an aliphatic group having from 8 to 18 carbon atoms, or an aryl radical and $R_1$ is H, an aliphatic group having from 8 to 18 carbon atoms, or an aryl radical. A particularly effective member of this group is di-2-ethyl hexyl phosphoric acid. Other members which are operative are mono octyl phosphoric acid, mono decyl phosphoric acid, mono dodecyl phosphoric acid, mono heptadecyl phosphoric acid, octyl phenyl phosphoric acid, di(2-ethyl - 4 - methyl pentyl)phosphoric acid, and di-iso-octyl phosphoric acid.

A third group of equivalent cationic agents for the organic extractant is the carboxylic acids, both aliphatic in which the carbon chains have from 6–20 carbon atoms, and aryl. Suitable members of this class are naphthenic, pelargonic, alpha-bromo-lauric acid

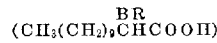

abietic acid, and acids having the following formulas:

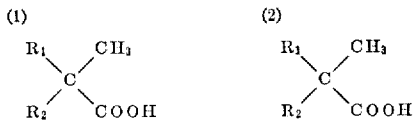

$R_1$ and $R_2$ are $C_9$, $C_{10}$ or $C_{11}$ chains
$R_1$ is hexyl
$R_2$ is octyl Numbers (1) and (2) are sold commercially by the Shell Chemical Co., Ltd. under the trade names Versatic 911 and Versatic 15/19, respectively. These compounds are mixtures of saturated, mainly tertiary monocarboxylic acids. They are made from olefins, water and carbon monoxide in the presence of a strong acid catalyst according to the following reaction:

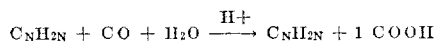

A fourth suitable class of cationic components for the organic extractant are aliphatic and aryl phosphate esters, such as tri-butyl phosphate, tri-amyl phosphate, tri-cyclohexyl phosphate, tri-n-octyl phosphate, tri-alpha-naphthyl phosphate, and tri-(ethyl phenyl)-phosphate.

The organic extractants can be used alone or with suitable inert diluents which are also immiscible with the aqueous feed solution undergoing treatment. The ordinary diluents or solvents used for the organic phase of solvent extraction systems can be used as the diluent for the organic extractant. These include aliphatic hydrocarbons such as octane and kerosine, an aromatic organic solvent having a flash point of 150° F., and aromatic solvents such as benzene and xylene. Particularly desirable diluents are "Sacosol" 150, an aromatic having a flash point of 185° F., and an aromatic organic solvent having a flash point of 135° F. sold commercially as "Cyclosol" 53. The components of the organic extractant must be substantially insoluble in water and soluble in the immiscible diluent.

The mechanical systems which may be used for the actual separation or extraction operations are well known in the art, that is, mixer-settler systems, centrifugal systems, pulse and agitated column, etc. A preferred system is a mixer-settler system in which the organic extractant is fed to Stage 1, the yttrium-rare earth feed is fed to Stage X, and a suitable scrub solution is fed to the last stage. The number of stages required, as well as the feed stage, can be theoretically calculated from distribution coefficient and separation factor data in the light of desired results for a particular situation. The aqueous feed and scrub solutions are transferred in the mixer-settler system counter-currently to the organic extractant.

In the modification by which the invention is illustrated the yttrium values or the middle rare earth values ($Sm_2O_3$—$Eu_2O_3$—$Gd_2O_3$—$Tb_4O_7$) as desired with adjusted conditions will remain in the aqueous phase, which leaves the mixture-settler circuit at Stage 1.

The purified yttrium or other rare earth metals can be recovered and separated from the salt out agent in the aqueous solution leaving Stage 1 by conventional means, such as direct precipitation or simple liquid ion exchange techniques. The salt out agent can then be recycled to the process. The organic extractant loaded with rare earth metal values on the organic extractant may be either the desired or undesired values.

Yttrium was separated from the salting agent by extraction with carboxylic acid or bis-2 ethyl hexyl hydrogen phosphate, stripped from the solvent with 30% nitric acid, precipitated as oxalate, and fired to give yttrium oxide of at least 99% purity.

The following examples are illustrative of the invention but not limiting thereof. In the examples, the quaternary ammonium nitrate referred to is the nitrate form of "Aliquat 336." All of the examples except one were run with batch systems. The designations "REO" and $R_4N$ used in the examples refer to rare earth oxides and "Aliquat 336," respectively. Reference to amidoximes in the examples refers to Nopchelate OS, previously defined. The feed solution used for the examples was an acid leach solution of typical rare earth metal concentrates which had been purified and concentrated to remove metals other than the rare earth metals.

The following procedure was followed for each of Examples 1, 2, 3, 5, 6, 8 and 9. Equal volumes of aqueous feed and organic extraction reagent were mixed in a separatory funnel for one minute at ambient temperature (25°–35° C.) until equilibrium was obtained. Ammonium hydroxide was added to obtain the desired hydrogen ion concentration. Sodium hydroxide may also be used if desired. The two phases were allowed to separate, after which each phase was analyzed by X-ray fluorescence techniques and the separation factor calculated relative to yttrium.

EXAMPLE 1

This example provides a comparative showing of the separation obtained between yttrium values and other rare earth metal values in a nitrate solution using two organic extraction reagents alone and mixed together. The organic extraction reagents used are di-2-ethylhexyl phosphoric acid (DEHPA—the cation extractor) and a quaternary ammonium nitrate compound ($R_4N$—the anion extractor). The diluents used were Sacosol 150 and Kerosine. A portion of the feed solution was added to each reagent listed as follows:

Reagent 1:
  5 volume percent DEHPA
  5 volume percent tri-butyl phosphate
  90 volume percent kerosine
Reagent 2:
  50 volume percent $R_4N$
  50 volume percent Sacosol 150
Reagent 3:
  5 volume percent DEHPA
  15 volume percent $R_4N$
  80 volume percent Sacosol 150

The aqueous rare earth metal solutions contained from 90 to 234 g./l. rare earth metals calculated as oxides and including yttrium oxide present in solution as nitrates. 2.5 M magnesium nitrate was used with the reagent 2 as a "salt out" agent in the aqueous solution.

The data presented in Table 1 shows that reagent 1 extracts heavy rare earth metal values (erbium to lutetium) preferentially to yttrium values, reagent 2 extracts light rare earth metal values (lanthanum to erbium) substantially greater than yttrium values, and reagent 3 (a mixture of the active extraction reagents) extracts both light and heavy rare earth metal values leaving a concentration of yttrium and middle rare earth metal values (Y, Sm, Gd, Tb) in the aqueous phase.

TABLE 1

[Effect of organic extraction reagent on separation of yttrium values from other rare earth metal values]

| Reagent | 1 (DEHPA) | 2 ($R_4N$) | 3 (DEHPA and $R_4N$) |
|---|---|---|---|
| Organic Phase: Assay, g./l. REO | 16.8 | 22.9 | 9.04 |
| Aqueous Phase: Assay, g./l. REO | 218.0 | 58.0 | 80.6 |

| Separation factors relative to yttrium | | | |
|---|---|---|---|
| Rare Earth Oxide: | | | |
| $La_2O_3$ | <0.14 | 10.30 | 8.17 |
| $CeO_2$ | <0.14 | 4.25 | 4.66 |
| $Pr_6O_{11}$ | <0.14 | 4.19 | 4.56 |
| $Nd_2O_3$ | <0.14 | 5.49 | 1.93 |
| $Sm_2O_3$ | <0.14 | 3.18 | 0.99 |
| $Gd_2O_3$ | 0.14 | 2.16 | 0.84 |
| $Tb_4O_7$ | 0.28 | 2.17 | 0.74 |
| $Dy_2O_3$ | 0.43 | 1.61 | 1.54 |
| $Ho_2O_3$ | 0.44 | 1.15 | 1.81 |
| $Er_2O_3$ | 1.25 | 1.30 | 1.78 |
| $Tm_2O_3$ | 3.98 | 0.96 | 3.66 |
| $Yb_2O_3$ | 3.19 | 0.88 | 2.78 |
| $Lu_2O_3$ | 4.53 | 0.92 | 3.14 |
| $Y_2O_3$ | 1.00 | 1.00 | 1.00 |

EXAMPLE 2

This example was performed like Example 1 except that a different cation extraction reagent, an amidoxime, "Nopchelate OS," was used. The diluent used was Sacosol 150. The reagent 2 date from Example 1 appears in this example under reagent 1 for comparison.

The aqueous rare earth metal nitrate solutions contained from 30 to 80 g./l. rare earth metal calculated as oxides and including yttrium oxide. Magnesium nitrate and ammonium nitrate were used as salt out reagents.

The organic extraction reagents employed are listed as follows:

Reagent 1:
  50 volume percent $R_4N$
  50 volume percent Sacosol 150
Reagent 2:
  40 volume percent Nopchelate OS
  60 volume percent Sacosol 150
Reagent 3:
  30 volume percent $R_4N$
  20 volume percent Nopchelate OS
  50 volume percent Sacosol 150

The data presented in Table 2 indicates that a mixture of the two organic extraction reagents ($R_4N$ and Nopchelate OS) has the capability of selectively separating yttrium values from other rare earth metal values. Examples 1 and 2 illustrate how the system conditions can be tailored to recover or isolate different rare earth metal values, i.e., in Example 1 the middle rare earth metal values were isolated along with yttrium values while in this example yttrium values alone were isolated.

TABLE 2

[Separation of yttrium values and other rare earth values employing a mixture of a quarternary ammonium nitrate compound and an amidoxime diluted in an aromatic material]

| Reagent | 1 | 2 | 3 |
|---|---|---|---|
| Aqueous phase: | | | |
| REO, g./l | 58.0 | 23.2 | 14.8 |
| Mg(NO₃)₂, M | 2.5 | 0 | 2.5 |
| NH₄NO₃, M | 0 | 4.0 | 0 |
| pH | 4.4 | 4.1 | 3.80 |
| Organic phase: REO, g./l | 22.9 | 9.1 | 25.4 |
| Separation factors relative to yttrium oxide | | | |
| La₂O₃ | 10.30 | <0.11 | >10.63 |
| CeO₂ | 4.25 | <0.11 | >10.63 |
| Pr₆O₁₁ | 4.19 | <0.11 | >10.63 |
| Nd₂O₃ | 5.49 | 0.11 | 10.63 |
| Sm₂O₃ | 3.18 | 0.16 | 5.33 |
| Eu₂O₃ | 2.16 | <0.50 | 8.33 |
| Gd₂O₃ | 2.16 | 0.50 | 2.32 |
| Tb₄O₇ | 2.17 | 0.83 | 3.13 |
| Dy₂O₃ | 1.61 | 1.94 | 2.30 |
| Ho₂O₃ | 1.15 | 2.28 | 2.17 |
| Er₂O₃ | 1.30 | 3.94 | 2.57 |
| Tm₂O₃ | 0.96 | 5.11 | 2.50 |
| Yb₂O₃ | 0.88 | 6.72 | 3.06 |
| Lu₂O₃ | 0.92 | 4.50 | 2.50 |
| Y₂O₃ | 1.00 | 1.00 | 1.00 |

EXAMPLE 3

The objective of this study was to determine the selective separation obtained between yttrium values and other rare earth metal values when using an organic extractant comprising a carboxylic acid and a quaternary ammonium nitrate blended in a common diluent.

The aqueous feed employed for this study contained from 80.5 to 84.1 g./l. rare earth metals calculated as oxides and including yttrium oxide present in solution as nitrates. Both 3 N NaNO₃ and 3 N Mg (NO₃)₂ additives were added as salt out agents to separate portions of the aqueous feed.

The organic extractant phase contained 15 volumes percent quaternary ammonium nitrate and 4 volume percent Versatic 9-11 (a carboxylic acid) mixed in an aromatic diluent Cyclosol 53.

The separation factors calculated relative to yttrium are presented in Table 3. The data indicate:

(1) The carboxylic acid-based extractant functions satisfactorily when compared to the amidoxime used in the previous examples.

(2) Sodium nitrate functions satisfactorily when compared to magnesium nitrate as a salt out agent.

(3) A decrease in hydrogen ion concentration results in decreased separation factors of the heavy rare earth metal values (holmium to lutetium).

TABLE 3

Separation factors related to yttrium values when using a mixed anion (R₄N) and cation (Versatic Acid 9-11) Extractant

| Experiment | 1 | 2 | 3 |
|---|---|---|---|
| "Salt out" media | 3 N Mg(NO₃)₂ | 3 N Mg(NO₃)₂ | 3 N NaNO₃ |
| Organic analysis: | | | |
| REO, g./l | 23.6 | 12.9 | 16.1 |
| Aqueous analysis: | | | |
| REO, g./l | 60.5 | 71.2 | 64.4 |
| pH | 5.0 | 4.2 | 4.8 |
| Separation factors relative to yttrium oxide | | | |
| La₂O₃ | 2.26 | 2.93 | 6.41 |
| CeO₂ | 2.01 | 6.98 | 9.12 |
| Pr₆O₁₁ | 1.82 | 5.00 | 5.39 |
| Nd₂O₃ | 3.08 | 5.99 | 4.13 |
| Sm₂O₃ | 3.87 | 5.74 | 4.09 |
| Eu₂O₃ | 3.20 | 2.64 | 2.84 |
| Gd₂O₃ | 1.96 | 3.39 | 2.19 |
| Tb₄O₇ | 2.66 | 3.54 | 2.66 |
| Dy₂O₃ | 2.68 | 2.62 | 2.07 |
| Ho₂O₃ | 2.52 | 2.14 | 1.71 |
| Er₂O₃ | 2.60 | 2.01 | 1.86 |
| Tm₂O₃ | 3.53 | 1.44 | 2.22 |
| Yb₂O₃ | 3.10 | 1.08 | 1.70 |
| Lu₂O₃ | 3.43 | 1.51 | 2.05 |
| Y₂O₃ | 1.00 | 1.00 | 1.00 |

EXAMPLE 4

A carboxylic acid based solvent was prepared by using 15 volume percent quaternary ammonium nitrate and 4 volume percent Versatic 9-11 in Cyclosol 53 as in Example 3. The solvent was brought in contact with the aqueous feed containing 80 g./l. of rare earth metals calculated as oxides and including yttrium oxide in a media of 4 M NH₄NO₃. Two shake outs in separatory funnels were made at equilibrium pH 4.7 and 5.46.

The separation factors are presented in Table 4. The data indicate that the system displays the extraction characteristic of a carboxylic acid based solvent where higher pH range for extraction is usually essential. At the working pH range of carboxylic acids, their separation capabilities are compatible to amidoxime and a media of ammonium nitrate is applicable.

TABLE 4

[Relationship of pH to separation factor in carboxylic acid based solvent system with aqueous in NH₄NO₃ media]

| pH | 4.7 | 5.46 |
|---|---|---|
| Organic analysis: REO, g./l | 13.6 | 23.25 |
| Aqueous analysis: REO, g./l | 62.8 | 61.0 |
| Separation factor relative to Y | | |
| La₂O₃ | 10.61 | 3.65 |
| CeO₂ | 9.02 | 3.38 |
| Pr₆O₁₁ | 8.68 | 3.44 |
| Nd₂O₃ | 4.36 | 2.57 |
| Sm₂O₃ | 4.65 | 2.81 |
| Eu₂O₃ | 3.45 | 1.94 |
| Gd₂O₃ | 2.18 | 1.62 |
| Tb₄O₇ | 3.83 | 2.09 |
| Dy₂O₃ | 2.22 | 2.24 |
| Ho₂O₃ | 2.06 | 1.93 |
| Er₂O₃ | 1.86 | 2.69 |
| Tm₂O₃ | 1.53 | 3.77 |
| Yb₂O₃ | 1.44 | 3.39 |
| Lu₂O₃ | 1.50 | 3.90 |
| Y₂O₃ | 1.00 | 1.00 |

EXAMPLE 5

The objective of this study was to determine the separation obtained between yttrium values and other rare earth metal values when using an organic extractant containing 15 volume percent trioctyl benzyl phosphonium nitrate and an amidoxime, "Nopchelate OS." The aqueous feed employed for this study contained 83.4 g./l. rare earth metals calculated as oxides and including yttrium oxide present, in a solution as nitrates. A 1.5 M Mg (NO₃)₂ salt out agent was added.

The organic extractants were diluted with Cyclosol 53.

The separation factors calculated relative to yttrium are presented in Table 5 and indicate that the quaternary phosphonium nitrate compound is an effective extraction reagent when used in combination with an amidoxime for the recovery of yttrium values.

TABLE 5

Separation factors related to yttrium values when using a mixed anion (quaternary phosphonium nitrate) and cation (amidoxime) extractant Organic analysis:
REO, g./l. — 22.6

Aqueous analysis:
REO, g./l. — 60.5
pH — 4.8

Separation factors relative to yttrium oxide

| | |
|---|---|
| La₂O₃ | 2.33 |
| CeO₂ | 1.55 |
| Pr₆O₁₁ | 1.26 |
| Nd₂O₃ | 2.11 |
| Sm₂O₃ | 2.50 |
| Eu₂O₃ | 1.77 |
| Gd₂O₃ | 1.85 |
| Tb₄O₇ | 2.15 |
| Dy₂O₃ | 2.60 |
| Ho₂O₃ | 2.66 |
| Er₂O₃ | 3.13 |
| Tm₂O₃ | 4.20 |
| Yb₂O₃ | 3.49 |
| Lu₂O₃ | 4.20 |
| Y₂O₃ | 1.00 |

EXAMPLE 6

The objective of this study was to determine the separation obtained between yttrium values and other rare earth metal values when using an organic extractant containing 15 vloume percent quaternary ammonium nitrate and 5 volume percent tributyl phosphate dissolved in Sacosol 150. The aqueous feed for this study contained 68.6 g./l. rare earth metals calculated as oxides and including yttrium oxide, present in solution as nitrates. A 1.5 M Mg $(NO_3)_2$ salt out agent was added to the aqueous feed.

The aqueous feed and organic extractant were mixed in equal volumes for one minute at ambient temperatures. Both phases were allowed to disengage and were analyzed for rare earth metals and yttrium content by X-ray fluorescence techniques. The separation factors calculated relative to yttrium are presented in Table 6 and indicate that the mixed quaternary ammonium nitrate and tributyl phosphate organic extractant will separate the ytterbium, lutetium and yttrium values from the other rare earth metal values with little difficulty, thus making it possible to obtain a concentrate containing values of these three rare earth metals which can be further purified using conventional techniques.

TABLE 6

Separation factors related to yttrium oxide when using a mixed anion (quaternary ammonium nitrate) and cation (tributyl phosphate) extractant Organic analysis:
    REO, g./l. _____ 18.6
Aqueous analysis:
    REO, g./l. _____ 50.4
    pH _____ 4.8

Separation factors relative to yttrium oxide $La_2O_3$ _____ 6.44
$CeO_2$ _____ 12.72
$Pr_6O_{11}$ _____ 8.00
$Nd_2O_3$ _____ 12.62
$Sm_2O_3$ _____ 10.71
$Eu_2O_3$ _____ 4.85
$Gd_2O_3$ _____ 3.33
$Tb_4O_7$ _____ 3.65
$Dy_2O_3$ _____ 2.39
$Ho_2O_3$ _____ 1.54
$Er_2O_3$ _____ 1.70
$Tm_2O_3$ _____ 1.35
$Yb_2O_3$ _____ 0.86
$Lu_2O_3$ _____ 1.09
$Y_2O_3$ _____ 1.00

EXAMPLE 7

The objective of this experiment was to investigate the separation of yttrium values from other rare earth values when using various aqueous salt out additive reagents. The system was studied in separatory funnels at ambient temperatures (25°–35° C.). The distribution of rare earth metal values calculaed as oxides in the aqueous feed solution used for this experiment was as follows:

Constituent:                                         Percent
$Y_2O_3$ _____ 60.90
$La_2O_3$ _____ 0.70
$CeO_2$ _____ 2.0
$Pr_6O_{11}$ _____ 0.30
$Nd_2O_3$ _____ 1.97
$Sm_2O_3$ _____ 2.51
$Eu_2O_3$ _____ 0.34
$Gd_2O_3$ _____ 5.52
$Tb_4O_7$ _____ 1.38
$Dy_2O_3$ _____ 13.0
$Ho_2O_3$ _____ 2.75
$Er_2O_3$ _____ 7.01
$Tm_2O_3$ _____ 0.91
$Yb_2O_3$ _____ 0.52

The organic extractant contained 15 volume percent quaternary ammonium compound, and 10 volume percent "Nopchelate OS" mixed in Cyclosol 53.

The solvent was loaded with rare earth metal values at a pH of approximately 4.0, after which the aqueous raffinate phase was discarded. The solvent was then separated into several fractions and contacted with various inorganic nitrate solutions containing equivalent salt concentrations at 4 Normal for 1 minute at an organic to aqueous phase volume ratio of approximately 1. Both organic and aqueous phases were analyzed for yttrium values and other rare earth metal values and separation factors relative to yttrium values calculated accordingly.

The data in Table 7 indicates that all salts used are effective as salt out agents. Mg $(NO_3)_2$ is a superior additive with $LiNO_3$, $Ca(NO_3)_2$ and $NaNO_3$ data indicating effectiveness, since all separation factors are greater than 1. Ammonium nitrate additive data indicates that a concentration of middle rare earth metal values, particularly those of Sm, Eu and Gd will result with yttrium values.

TABLE 7

[Effect of various "salt out" additives on the separation of yttrium values and other rare earth metal values using a combination anion ($R_4N$) and a cation (Nopchelate OS) organic extraction reagent diluted in an aromatic material (Cyclosol 53)]

| Additive (4 N) | $Mg(NO_3)_2$ | $LiNO_3$ | $Ca(NO_3)_2$ | $NaNO_3$ | $Al(NO_3)_3$ | $NH_4NO_3$ |
|---|---|---|---|---|---|---|
| Organic analysis: REO, g./l. | 13.2 | 15.5 | 10.7 | 10.4 | 5.4 | 6.4 |
| Aqueous analysis: | | | | | | |
| REO, g./l. | 12.2 | 14.5 | 18.0 | 18.8 | 19.8 | 22.0 |
| pH | 3.50 | 3.35 | 3.35 | 3.45 | 2.60 | 3.49 |
| Separation factors relative to yttrium oxide | | | | | | |
| $La_2O_3$ | 5.88 | >3.23 | 7.12 | 6.23 | <11.63 | 1.94 |
| $CeO_2$ | 3.31 | 3.23 | 9.71 | 2.95 | <11.63 | 2.92 |
| $Pr_6O_{11}$ | 3.58 | >2.99 | 14.24 | 3.46 | <11.63 | 1.94 |
| $Nd_2O_3$ | 5.27 | 2.99 | 3.66 | 3.87 | 11.63 | 1.79 |
| $Sm_2O_3$ | 4.07 | 3.16 | 1.87 | 1.95 | 5.31 | 0.97 |
| $Eu_2O_3$ | 2.71 | 1.44 | 1.07 | 1.55 | 2.96 | 0.43 |
| $Gd_2O_3$ | 1.90 | 1.54 | 1.47 | 1.25 | 2.52 | 0.81 |
| $Tb_4O_7$ | 2.86 | 2.16 | 1.47 | 1.55 | 2.37 | 1.05 |
| $Dy_2O_3$ | 2.52 | 2.13 | 1.84 | 5.46 | 2.00 | 1.85 |
| $Ho_2O_3$ | 2.47 | 1.92 | 1.67 | 2.15 | 1.40 | 1.85 |
| $Er_2O_3$ | 3.28 | 2.76 | 2.29 | 2.75 | 1.42 | 3.16 |
| $Tm_2O_3$ | 2.94 | 2.23 | 2.41 | 3.67 | 0.70 | <3.16 |
| $Yb_2O_3$ | 4.01 | 3.40 | 2.90 | 3.95 | 0.65 | 4.95 |
| $Lu_2O_3$ | 3.62 | 1.85 | 4.22 | 4.15 | 0.61 | 4.87 |
| $Y_2O_3$ | 1.00 | 1.00 | 1.00 | 1.00 | 1.00 | 1.00 |

EXAMPLE 8

The objective of this experiment was to determine the effect of hydrogen ion concentration or pH on the separation of yttrium values from other rare earth metal values.

The aqueous feed contained 40 g./l. rare earth metals calculated as oxides and including yttrium oxide, present in solution as nitrates. 2.5 M Mg (NO$_3$)$_2$ was added as the salt out additive.

The organic extraction reagent contained 30 volume percent quaternary ammonium compound and 20 volume percent amidoxime (Nopchelate OS) mixed with Sacosol 150.

The data indicates that the operating pH can be from pH 2.12 to pH 6.10 using this concentration of solvent. The separation factors for the heavy rare earth metal values have a tendency to decrease as the pH is decreased. Higher acid concentrations would decrease the heavy rare earth metal value separation factor until no separation from yttrium values would be obtained.

The separation factors for the light rare earth metal values have a tendency to decrease as the acidity is decreased, indicating the quaternary ammonium nitrate compound less active at high pH values.

traction reagent. For example, a 15 volume percent of anionic extraction reagent, R$_4$N, was held constant while the volume percent of cationic extraction reagent, amidoxime, was varied from 10 to 30 volume percent. Likewise, 10 volume percent of cationic extraction reagent (amidoxime) was held constant while volume percent of anionic extraction reagent R$_4$N was varied from 15 to 30 volume percent.

The aqueous rare earth nitrate solution employed for this study contained from 84 to 88.02 g./l rare earth metals calculated as oxides and including yttrium oxide. Magnesium nitrate in the concentration of 1.5 molar was added as salt out reagent.

The data presented in Table 9 indicates the effective separation of yttrium values from other rare earth metal values with extractant composition having proper ratio between the anion extractant (R$_4$N) and the cation extractant (amidoxime). No advantage is gained with excessive cation extractant (col. 3), although excess of anion extractant imparts no detrimental effect. In view of the economy and extraction characteristics of the organic phase, an extractant composition of 15 volume percent R$_4$N and 10 volume percent amidoxime is the preferred solvent extractant composition for the process of yttrium purification.

TABLE 9

[Separation factors related to yttrium values when using various mixtures of anion (quaternary ammonium nitrate) and cation (amidoxime) extractants]

| | R$_4$N | Amid-oxime | Cyclo-sol 53 | R$_4$N | Amid-oxime | Cyclo-sol 53 | R$_4$N | Amid-oxime | Cyclo-sol 53 | R$_4$N | Amid-oxime | Cyclo-sol 53 | R$_4$N | Amid-oxime | Cyclo-sol 53 |
|---|---|---|---|---|---|---|---|---|---|---|---|---|---|---|---|
| Extractant composition, percent | 15 | 10 | 75 | 15 | 20 | 65 | 15 | 30 | 55 | 20 | 10 | 70 | 30 | 10 | 60 |
| Organic analysis: REO, g./l | 28.9 | | | 37.8 | | | 47.8 | | | 31.6 | | | 41.2 | | |
| Aqueous analysis: REO, g./l | 59.12 | | | 46.8 | | | 36.8 | | | 52.4 | | | 42.8 | | |
| pH | 4.72 | | | 4.76 | | | 4.82 | | | 4.72 | | | 4.79 | | |

| | Separation factors relative to yttrium values |
|---|---|
| La$_2$O$_3$ | 3.57 — 3.03 — 1.38 — 4.34 — 3.78 |
| CeO$_2$ | 8.16 — 3.54 — 2.78 — 4.52 — 5.81 |
| Pr$_6$O$_{11}$ | 3.38 — 2.69 — 1.62 — 2.41 — 7.32 |
| Nd$_2$O$_3$ | 3.68 — 2.12 — 1.59 — 3.93 — 4.56 |
| Sm$_2$O$_3$ | 3.80 — 2.26 — 1.59 — 3.57 — 4.51 |
| Eu$_2$O$_3$ | 2.96 — 1.36 — 1.03 — 2.58 — 3.05 |
| Gd$_2$O$_3$ | 2.11 — 1.63 — 0.89 — 1.99 — 2.42 |
| Tb$_4$O$_7$ | 3.00 — 2.16 — 1.41 — 2.24 — 3.44 |
| Dy$_2$O$_3$ | 2.98 — 2.55 — 1.85 — 2.34 — 3.04 |
| Ho$_2$O$_3$ | 2.70 — 2.95 — 1.82 — 1.99 — 2.89 |
| Er$_2$O$_3$ | 3.47 — 3.67 — 2.79 — 2.27 — 3.15 |
| Tm$_2$O$_3$ | 5.16 — 4.04 — 2.17 — 2.50 — 2.55 |
| Yb$_2$O$_3$ | 3.79 — 4.84 — 3.81 — 2.70 — 4.74 |
| Lu$_2$O$_3$ | 2.68 — 4.06 — 2.39 — 2.89 — 2.84 |
| Y$_2$O$_3$ | 1.00 — 1.00 — 1.00 — 1.00 — 1.00 |

TABLE 8

[Effect of hydrogen ion concentration on separation factors of yttrium values and other rare earth metal values]

| pH | 2.12 | 3.47 | 3.80 | 6.10 |
|---|---|---|---|---|
| Organic analysis: REO, g./l | 15.6 | 25.2 | 25.40 | 19.3 |

| Separation factors relative to yttrium oxide | | | | |
|---|---|---|---|---|
| La$_2$O$_3$ | >3.12 | 5.58 | >10.63 | 1.80 |
| CeO$_2$ | >3.12 | >5.58 | >10.63 | 1.39 |
| Pr$_6$O$_{11}$ | 3.12 | 7.61 | >10.63 | 0.76 |
| Nd$_2$O$_3$ | 3.54 | 3.36 | 10.63 | 1.22 |
| Sm$_2$O$_3$ | 4.54 | 3.04 | 5.33 | 1.60 |
| Eu$_2$O$_3$ | 2.50 | 4.57 | 8.33 | 1.52 |
| Gd$_2$O$_3$ | 3.14 | 2.47 | 2.32 | 1.55 |
| Tb$_4$O$_7$ | 3.04 | 2.84 | 3.13 | 2.35 |
| Dy$_2$O$_3$ | 2.68 | 2.61 | 2.30 | 2.74 |
| Ho$_2$O$_3$ | 2.58 | 3.17 | 2.17 | 2.69 |
| Er$_2$O$_3$ | 2.54 | 3.78 | 2.57 | 4.06 |
| Tm$_2$O$_3$ | 2.08 | 4.82 | 2.50 | 5.70 |
| Yb$_2$O$_3$ | 1.73 | 3.00 | 3.06 | 3.04 |
| Lu$_2$O$_3$ | 1.79 | 5.07 | 2.50 | 5.70 |
| Y$_2$O$_3$ | 1.00 | 1.00 | 1.00 | 1.00 |

EXAMPLE 9

The objective of this experiment was to determine the effect of extractant concentration on the separation of yttrium values from other rare earth metal values.

The mixed organic extractant was composed of an anion (R$_4$N) and a cation (amidoxime) diluted in Cyclosol 53. Various concentrations of the components of the mixed organic extractant were made by holding one ex-

EXAMPLE 10

The objective of this study was to demonstrate the applicability of the combined organic extraction reagent for yttrium purification from a feed solution of a combined mixture of yttrium values and rare earth values in a continuous counter current mixer-settler system.

The mixer-settler system consisted of 40 stages, each stage having a mixer and settler. The aqueous feed was introduced to stage 25, the 1.0 M Mg (NO$_3$)$_2$ scrub solution to stage 40 and the organic phase to stage 1. The solvent loaded with rare earth metal values was stripped of the rare earth metal values in a batch operation before being introduced to the continuous system. Sufficient ammonia solution was fed to the mixer of stage 1 to result in a pH of 4.0 to 4.5.

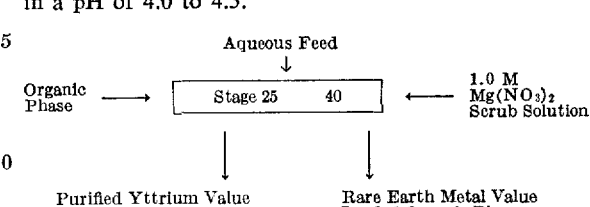

The continuous system was operated for 120 hours, the yttrium was recovered as the oxide from the purified aqueous concentrate and submitted for mass spectrographic analysis. The results which appear in Table 10 clearly show the effectiveness of the mixed organic reagent for recovering yttrium values in a countercurrent system.

The organic extractant used for this study consisted of 15 volume percent quaternary ammonium nitrate ("Aliquat 336") and 10 volume percent of an amidoxime (Nopchelate OS) mixed in Sacosol 150.

The aqueous feed contained 60 g./l. $Y_2O_3$ and 40 g./l. of other rare earth oxides present in solution as nitrates to be removed by purification, and 2.3 M Mg $(NO_3)_2$. The hydrogen ion concentration (pH) was 4.0. The scrub solution contained 1.0 M Mg $(NO_3)_2$ at a pH of approximately 7.0.

TABLE 10

Mass spectrographic analysis showing purification obtained in a 40-stage mixer-settler circuit employing a combined organic anion ($R_4N$) cation (Amidoxime) extractant

| | Aqueous feed, analysis, p.p.m. | Purified yttrium oxide, p.p.m. |
|---|---|---|
| $La_2O_3$ | 7,000 | 1.2 |
| $CeO_2$ | 2,000 | 0.5 |
| $Pr_6O_{11}$ | 3,000 | 0.5 |
| $Nd_2O_3$ | 19,700 | 2.3 |
| $Sm_2O_3$ | 25,100 | 5.0 |
| $Eu_2O_3$ | 3,400 | 0.2 |
| $Gd_2O_3$ | 55,200 | 230.0 |
| $Tb_4O_7$ | 13,800 | 2.3 |
| $Dy_2O_3$ | 130,000 | 23.0 |
| $Ho_2O_3$ | 27,500 | 3.3 |
| $Er_2O_3$ | 70,010 | 11.0 |
| $Tm_2O_3$ | 9,100 | 1.1 |
| $Yb_2O_3$ | 41,800 | 3.4 |
| $Lu_2O_3$ | 5,200 | <0.3 |

The examples show that the mixtures of various organic anionic and cationic extractants are effective for separating rare earth metal values in aqueous solution as illustrated by the separation of yttrium values and the middle rare earth metal values from other members of the series. The process is performed in a continuous countercurrent system with a greatly reduced number of required extraction stages than is usually required.

Although magnesium nitrate is the preferred salt out agent, the examples show that the nitrates of the alkali and other alkaline earth metals and those of aluminum and ammonium are also operative. The process can be operated within a pH range of about 2 to about 6.

The examples further show that the percentage composition of the components within the organic extractant mixture can vary widely, with the volume content of each anionic and cationic components varying from about 10 to 30 volume percent in the organic phase.

The invention provides an effective process for the selective separation of yttrium values. When applied to a rare earth metal nitrate-magnesium nitrate aqueous system, the organic phase preferentially extracts rare earth metal values leaving yttrium values concentrated in the aqueous phase.

What is claimed is:

1. A process for selectively recovering yttrium values from aqueous solution containing an inorganic nitrate, yttrium with other rare earth metal values which comprises: contacting the solution with an organic extractant in a water immiscible hydrocarbon diluent or solvent forming an organic phase, the organic extractant comprising a mixture of:

(1) an anionic extraction agent selected from the group of compounds consisting of ammonium and phosphonium compounds represented by the formula:

wherein $R_1$ is an aliphatic hydrocarbon chain having from 8 to 18 carbon atoms, or an aryl group, and R is an aliphatic hydrocarbon group having from 1 to 18 carbon atoms, or an aryl group, M is a nitrogen atom or a phosphorus atom, and X is an anion, and (2) a cationic extraction agent selected from the group consisting of aliphatic and aryl phosphates, carboxylic acids represented by the formula:

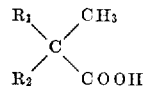

wherein $R_1$ and $R_2$ are hydrocarbon chains having from 6 to 20 carbon atoms, or aryl, organophosphoric acids represented by the formula:

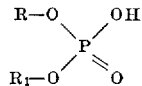

wherein R is an aliphatic hydrocarbon group having 8 to 18 carbon atoms, or aryl, and $R_1$ is hydrogen, an aliphatic group having from 8 to 18 carbon atoms, or aryl, oximes represented by the formulas:

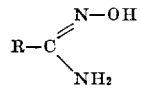

wherein R is an aliphatic hydrocarbon radical having from 6 to 20 carbon atoms, or an aryl radical:

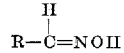

wherein R is an aliphatic hydrocarbon radical having from 6 to 20 carbon atoms, or an aryl radical:

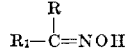

wherein R and $R_1$ are aliphatic hydrocarbon radicals having from 6 to 20 carbon atoms, or an aryl radical, and

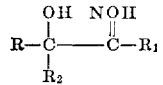

wherein R, $R_2$ and $R_1$ are aliphatic hydrocarbon radicals having from 6 to 20 carbon atoms; maintaining a pH of about 2 to about 6 whereby yttrium remains in the aqueous phase and said other rare earth metal values are extracted in the organic phase; separating said aqueous phase from said organic phase; and recovering yttrium values from said aqueous phase.

2. The process of claim 1 in which the aqueous solution contains a relatively high nitrate ion concentration, the pH of the solution is maintained between about 2 and about 6, and the relative amount of anionic extraction agent to cationic extraction agent in the organic extractant varies from about one-half to about three.

3. The process of claim 2 in which the concentration of the feed solution varies from about 30 to about 234 grams of rare earth metal per litre based on the oxide and the aqueous solution contains an inorganic nitrate selected from the group consisting of alkali and alkaline earth metal nitrates, ammonium nitrate and aluminum nitrate at a concentration between about 1 and 4 normal.

4. The process of claim 1 in which the cationic extraction agent is an amidoxime selected from the group represented by the formula:

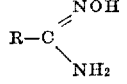

wherein R is an aliphatic hydrocarbon radical having from 6 to 20 carbon atoms, or an aryl radical.

5. The process of claim 4 in which the anionic extraction agent is a quaternary ammonium compound.

6. The process of claim 5 in which the quaternary ammonium compound is tricaprylyl monomethyl ammonium nitrate and the amidoxime is represented by the formula:

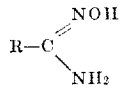

wherein R is a hydrocarbon chain having 11 or 12 carbons or a pentane ring.

7. The process of claim 6 in which the aqueous solution contains a magnesium nitrate concentration between about 1 and 4 normal.

8. The process of claim 2 in which the anionic extraction agent is tricaprylyl monomethyl ammonium nitrate.

9. The process of claim 8 in which the cationic extraction agent is di-2-ethylhexyl phosphoric acid.

10. The process of claim 8 in which the cationic extraction agent is a member selected from the group consisting of compounds represented by the formulas:

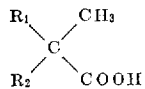

wherein $R_1$ and $R_2$ are hydrocarbon chains having from 9 to 11 carbon atoms, and

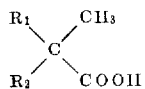

wherein $R_1$ is hexyl and $R_2$ is octyl.

11. The process of claim 8 in which the cationic extraction agent is tributyl phosphate.

12. The process of claim 2 in which the anionic extraction agent is trioctyl benzyl phosphonium nitrate and the cationic extraction agent is a member from the group consisting of undecyl, dodecyl and cyclo pentane amidoximes.

13. The process of claim 1 directed to the recovery of said other rare earth metal values in which the latter are recovered from the organic phase.

14. The process of claim 13 whereby different percentages of said other rare earth metal values are extracted in said organic phase and including the step of selectively recovering said other rare earth metal values from said organic phase.

References Cited

UNITED STATES PATENTS

| 2,564,241 | 8/1951  | Warf            | 23—19X   |
| 2,634,280 | 4/1953  | Tribalat et al. | 23—22X   |
| 2,909,542 | 10/1959 | Soloway         | 23—312ME |
| 3,230,036 | 1/1966  | Kappelmann et al. | 23—18X |
| 3,323,857 | 6/1967  | Bauer et al.    | 23—23    |
| 3,482,932 | 12/1969 | Gump            | 23—22    |
| 3,514,267 | 5/1970  | Sherrington et al. | 23—312ME |

HERBERT T. CARTER, Primary Examiner

U.S. Cl. X.R.

23—23, 24, 312